June 23, 1970    H. C. SHANK, JR., ET AL    3,516,849
METHOD AND MEANS FOR SURFACE COATING MOVING ROWS OF GLASSWARE
Filed Dec. 6, 1966    3 Sheets-Sheet 1
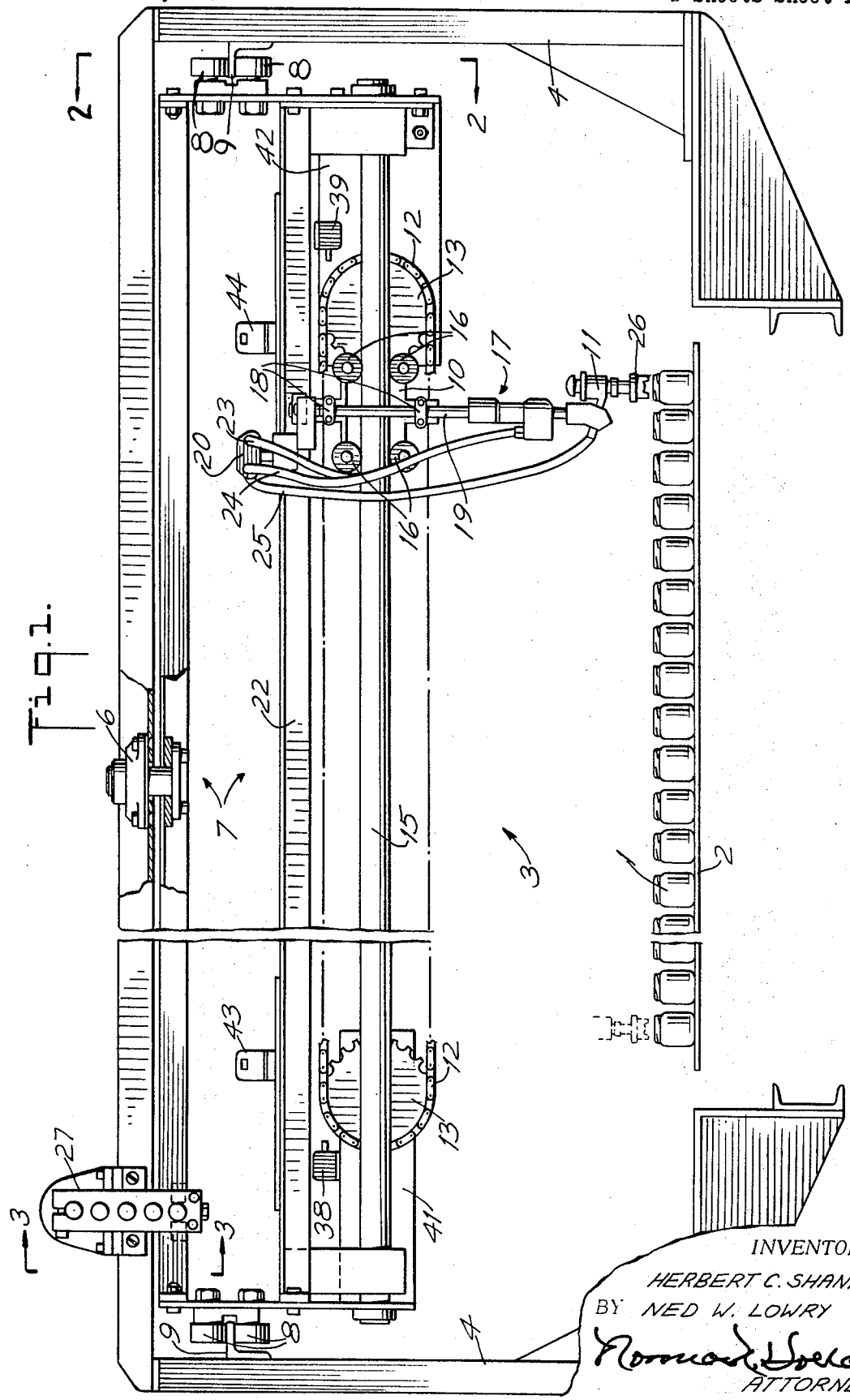
INVENTOR.
HERBERT C. SHANK, JR.
BY NED W. LOWRY
ATTORNEY

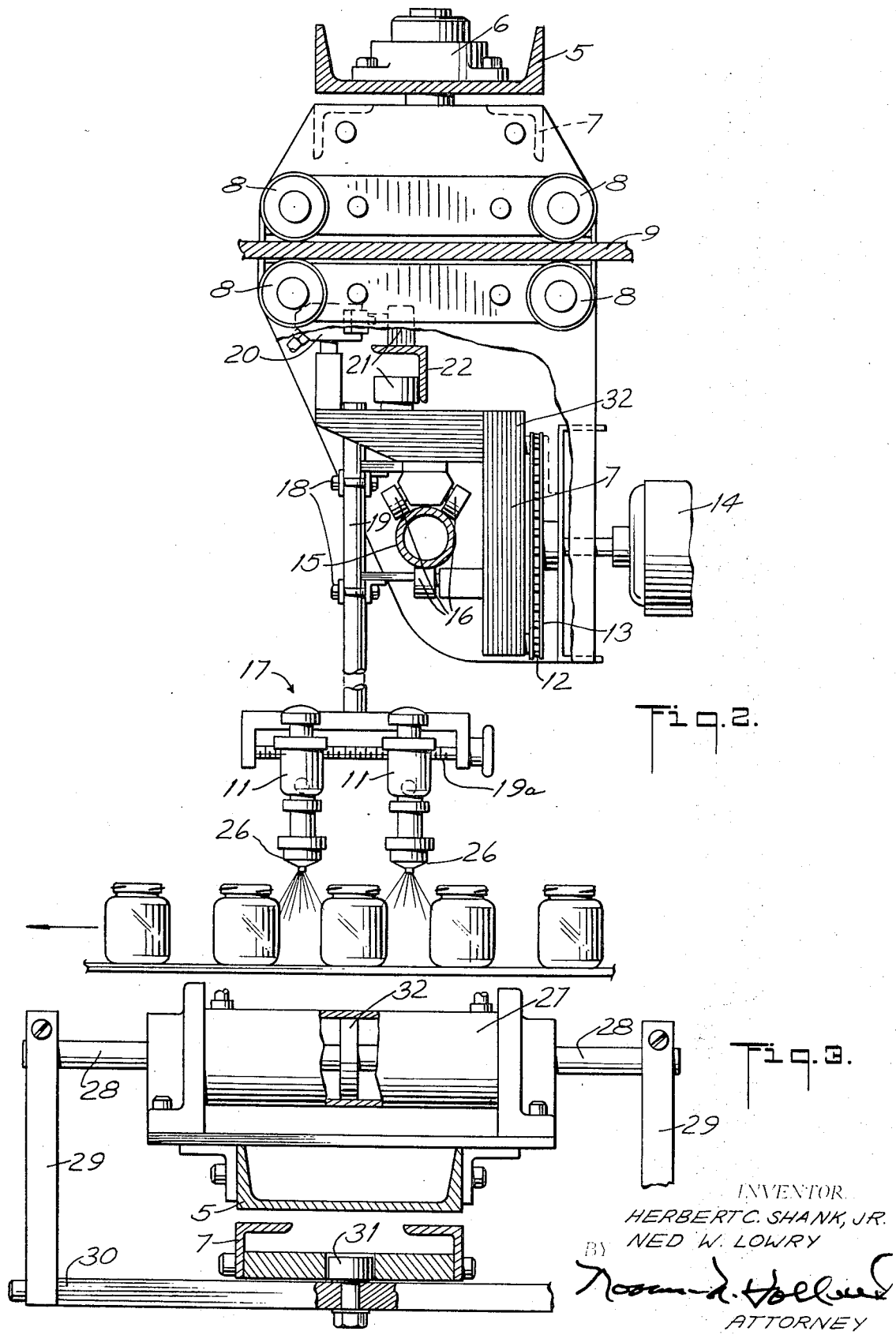

June 23, 1970  H. C. SHANK, JR., ET AL  3,516,849
METHOD AND MEANS FOR SURFACE COATING MOVING ROWS OF GLASSWARE
Filed Dec. 6, 1966  3 Sheets-Sheet 3
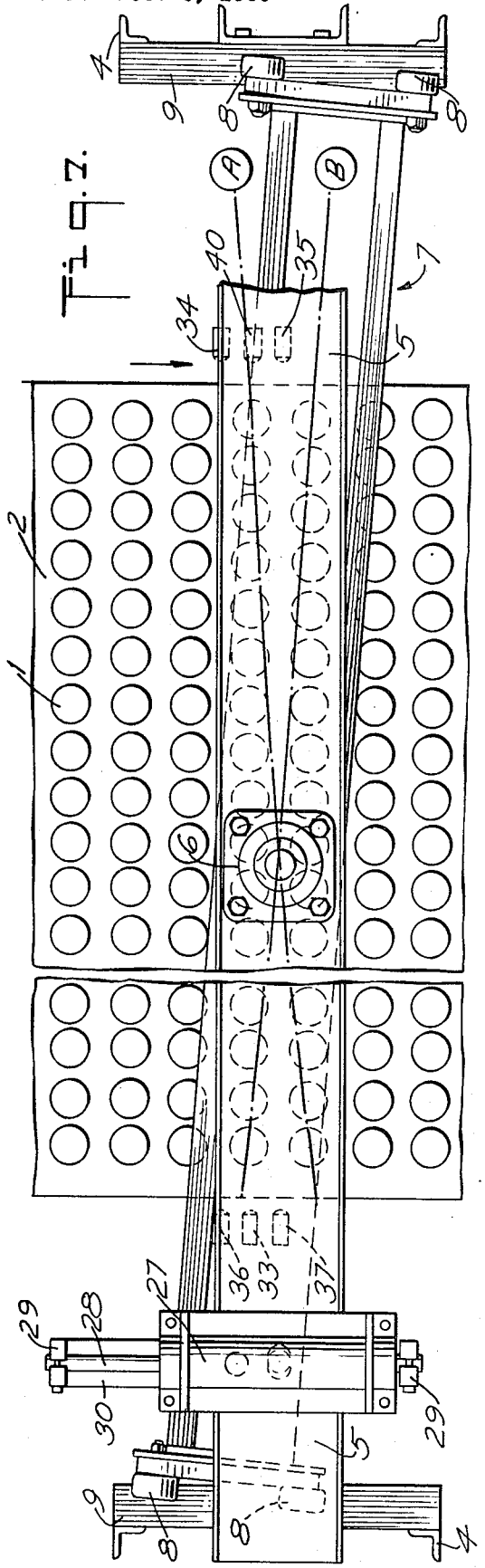
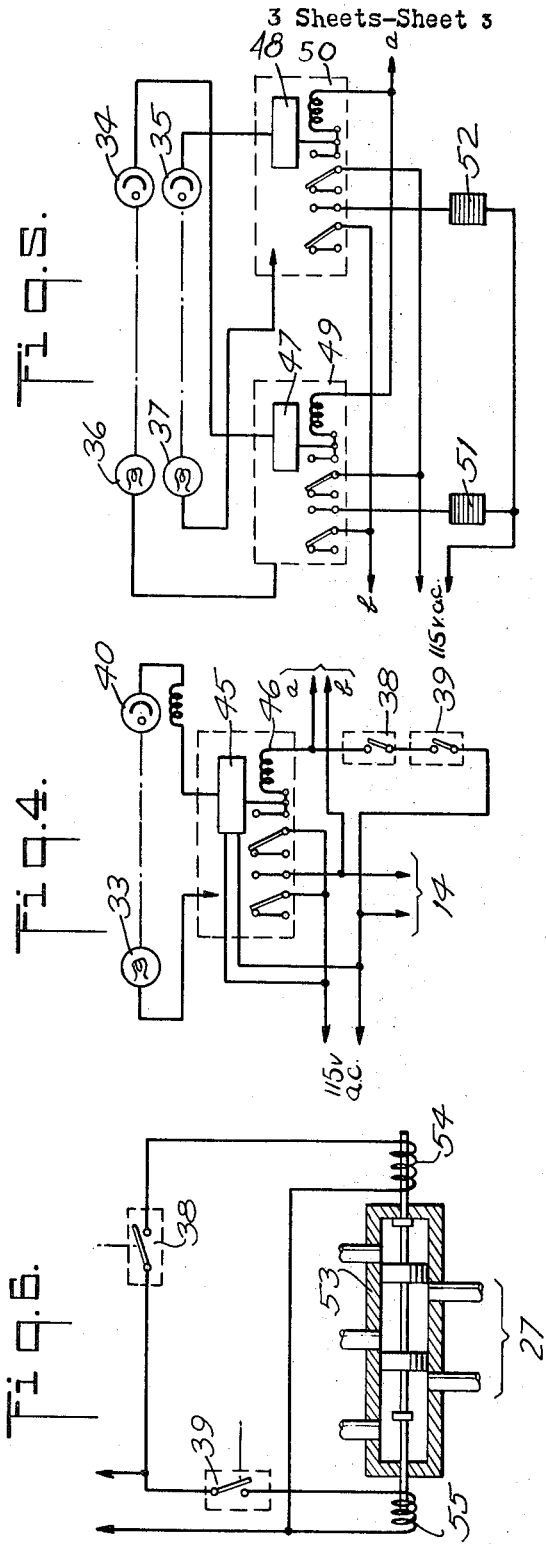
INVENTOR.
HERBERT C. SHANK, JR.
NED W. LOWRY
BY
Norman T. Holland
ATTORNEY United States Patent Office 3,516,849
Patented June 23, 1970

1

3,516,849
METHOD AND MEANS FOR SURFACE COATING MOVING ROWS OF GLASSWARE
Herbert C. Shank, Jr., and Ned W. Lowry, Lancaster, Ohio, assignors to Anchor Hocking Corporation, Lancaster, Ohio, a corporation of Delaware
Filed Dec. 6, 1966, Ser. No. 599,440
Int. Cl. B05b 13/04; C03c 17/00
U.S. Cl. 117—94                                      9 Claims

ABSTRACT OF THE DISCLOSURE

A spray coating apparatus for coating rows of glass containers travelling on a conveyor. The spray moves laterally across the conveyor in both directions during the spraying operation. The spray is kept between the container rows on both passes by a pivotal mounting of its support. The support is pivoted or turned at the end of each traverse by having the spray device contact microswitches. The spray device may mount two spray heads which move between adjacent rows of containers and which simultaneously coat the front and back portions of the containers in one row and one side of the containers in flanking rows. Separate photoelectric means initiate the travel of the spray device and sense obstructions in the empty rows to turn off the spray during its travel.

---

This invention relates to the art of making glassware and more particularly to an improved apparatus and method for applying uniform protective surface coatings by spraying the glass articles while they are being advanced in aligned rows from the annealing lehr on a conveyor in a continuous and automatic operation.

It has been common practice to apply a lubricating coating to the outer surfaces of glass articles during manufacture to facilitate their handling through the various operations. The earlier coatings used such as silicone or stearate sprays provided sufficient lubrication for the operating speeds previously used. However, a continually increasing demand for glass containers and similar glass articles has made increases in article handling speeds necessary.

To facilitate the increase in operating speeds and to protect and lubricate the glass articles during this handling improved protective coatings have been developed which when effectively applied significantly reduce article jamming, scratching and breaking.

A spray coating apparatus has also been developed and used for applying these coatings and particularly for use in connection with the relatively wide article conveyor belts which are normally used to remove the formed and annealed articles from the glass annealing lehrs. Apparatus of this type is described, for example, in U.S. Pat. No. 2,246,502 which describes a reciprocating spray device for use with a moving conveyor and in Pats. Nos. 2,281,169 and 2,488,519 which describe driven spray devices whose motion above the sprayed articles is controlled by suitable photocells.

However, these spray nozzle support arrangements are of the general type as illustrated in Pat. No. 1,929,896 wherein the spray nozzle carriage path is angled across the moving conveyor to compensate for the forward motion of the rows of containers during the sprayer pass and to thereby maintain the nozzle between the rows. Heretofore, in this type of arrangement, the spraying operation was necessarily done on the initial pass across the conveyor and the sprayer was shut off during the return of the nozzle carriage across the conveyor. This has limited the speed of the conveyor operation and results in inefficient use of the carriage.

2

The present invention provides for the spraying operation to occur during the initial passage of the carriage over the conveyor and in addition during the return pass. This is accomplished by providing for the pivoting of the spray carriage support so as to permit the spray nozzle to be angled across the moving conveyor during the return run in such manner as to maintain it between the advancing rows of containers. An improved control system is also provided to facilitate this more efficient operation.

Accordingly it is an object of the present invention to provide an improved apparatus and method for applying a protective coating to articles.

Another object of the present invention is to provide such an apparatus and method for spray coating open mouth glass containers.

Another object of the present invention is to provide such an apparatus and method which avoids spraying the interior of open mouth containers.

Another object of the present invention is to provide such an apparatus and method for achieving increased speeds in glass manufacture by operating the spraying means on both passes over the conveyor.

Another object of the present invention is to provide a more efficient apparatus and method of operation for a lubricity sprayer by eliminating the non-spraying return pass.

A further object of the present invention is to provide such an apparatus and method with simplified controls which permit completely automatic operation.

Another object of the present invention is to provide such an apparatus and method which permits continuous operation of the conveyor by eliminating any need for stopping or interrupting its forward movement.

Another object of the present invention is to provide such an apparatus and method which is achieved by modifying the conventional structure.

A preferred embodiment of the invention has been chosen for purposes of illustration and description and is shown in the accompanying drawings, forming a part of the specification, wherein:

FIG. 1 is a front elevational view of the apparatus of the present invention with the row of containers advancing toward the viewer;

FIG. 2 is a sectional view of the apparatus of the present invention taken along the lines 2—2 in FIG. 1 with parts broken away to better reveal the structure and with the containers advancing in the direction of the arrow;

FIG. 3 is a sectional view of the actuator means and the associated structure taken along the lines 3—3 of FIG. 1;

FIG. 4 is a schematic diagram of a preferred embodiment of the improved control circuit for initiating operation of the sprayer carriage;

FIG. 5 is a schematic diagram of a preferred embodiment of the improved control circuit which prevents operation of the sprayer means when an obstruction appears in the space before or after a row of containers.

FIG. 6 is a schematic diagram of a preferred embodiment of the improved control circuit which controls the pilot valve in the line supplying pneumatic operating pressure to the actuator.

FIG. 7 is a top plan view of the apparatus of the present invention showing the sprayer carriage support frame in the position B.

Referring to FIG. 1, the glass articles 1 arranged in successive transverse rows are transported from the annealing lehr (not shown) on a moving conveyor 2. The spraying apparatus 3 of the present invention for applying the protective coatings is positioned above the conveyor 2, adjacent the exit from the annealing lehr. This apparatus is shown supported by the two support columns 4 positioned on either side of the conveyor 2 having a crossbeam 5 mounted thereon above the conveyor 2 and arranged perpendicular to the path of movement of the containers 1. However, it will be clear to those skilled in the art that any supporting arrangement will be suitable which is capable of pivotally suspending the apparatus 3 above the conveyor. With this in mind the construction of the present invention will now be described.

A pivot joint 6 is mounted at the center of the crossbeam 5 and has its axis of rotation above the center line of the conveyor 2. A frame 7 is mounted on this pivot joint 6 and fitted at its ends with rollers 8 which ride on track means 9 mounted on each of the support columns 4. A carriage 10 is mounted for reciprocal movement on the frame 7 and carries the dual spraying heads or guns 11. The carriage 10 is driven in reciprocating movement across the frame member 7 by a continuous chain 12 reeved about laterally spaced sprockets 13 which are mounted at opposite ends of the frame 7. The sprockets 13 are driven by a suitable electric motor 14 (shown in FIG. 2) in a manner well-known in the art. The sprockets 13 drive the chain 12 continuously in one direction while the motor 14 is operating and the chain 12 is connected to drive the carriage 10 to effect a transverse movement thereof to and fro across the conveyor 2 by a suitable linkage also well-known in the art.

The carriage 10 is mounted on a tubular track 15 at the lower part of the frame 7 by means of the rollers 16 which ride thereon. The spray head assembly 17 is mounted by brackets 18 to the carriage 10 and comprises the dual spray heads or guns 11 suspended from support column 19 and the spray supply and control mechanism 20 which rides by means of rollers 21 (shown in FIG. 2) on the beam 22 above the tubular track 15. Flexible conduits 23, 24 and 25 supply the spray solution, atomizing air, and control air, respectively, to the spray guns 11. The latter line 25 operates a needle valve which controls the spraying and non-spraying sequence to be described hereinafter.

As best seen in FIG. 2, the spray guns 11 are each preferably mounted vertically on the adjustable mounting 19a. This arrangement permits the spray nozzles 26 to thoroughly spray both sides of the center row of containers as well as the nearer sides of the two adjacent rows of containers during each pass of the carriage and avoids the spraying of the insides of the open mouth containers. Thus, each row of containers receives a double application of the lubricity coating material.

Where a double application of coating is not advantageous, the spray guns 11 may be tilted inwardly to concentrate all or a substantial portion of their spray on the center row of containers or alternatively the carriage may be moved across the conveyor only once for each two rows of containers by including a counter in the carriage activating system.

Also in this regard, in order that the dual nozzles 26 while spraying will pass between the rows of containers 1 rather than above them, it is necessary to compensate for the forward motion of the rows on the conveyor. The motion of the carriage 10 and the depending spray guns 11 must therefore be at an angle to the direction of the moving conveyor 2 in order to keep up with the forward advance of the rows of containers being sprayed. The support frame 7 on which the carriage 10 rides must therefore be angularly adjustable with respect to the conveyor's direction of motion. This adjustment is achieved by the use of the pivot joint mounting 6 and actuation system of the present invention.

As shown in detail in FIG. 3 an air cylinder actuating means 27 is provided to pivot the frame 7 about the joint 6 between two appropriate preset angular positions A and B (indicated in FIG. 7). The dual acting cylinder 27 containing piston 32 is mounted on the crossbeam 5 with the piston rods 28 extending from either end and attached to the frame 7 by means of the arms 29 and 30 and the pivot 31. The cylinder 27 is fixed on the crossbeam 5 with its axis parallel to the direction of motion of the conveyor so that the piston rods 28 act along this axis. The pivot 31 is therefore provided to permit the frame 7 to assume the angular positions A or B required for proper operation upon actuation of the piston 32.

The particular settings of positions A and B will vary with the speed of the conveyor and of the carriage in traversing it. These two speeds must therefore be determined and the appropriate positions of A and B preset prior to initiating operation on the system.

The frame 7 is caused to alternately pivot between these two positions A and B when the sprayer support carriage 10 strikes a respective microswitch 38 or 39 mounted on suitable plates 41 and 42, respectively, at opposite ends of the frame 7 as best shown in FIG. 1. The microswitches 38 and 39 are part of the improved control system for the apparatus which system is shown in schematic form in FIGS. 4, 5 and 6 and will now be described.

Firstly, referring to FIG. 7, motion of the spray support carriage 10 is initiated by a photocell 40 mounted adjacent the conveyor and activated by a light source 33 mounted on the other side directly across the conveyor. This photocell 40 initiates motion of the sprayer support carriage 10 across the conveyor when the light beam from source 33 is interrupted by a passing row of containers. When the cell 40 is interrupted a signal is sent to the photocell amplifier 45 (shown in FIG. 4) which will cause the associated control relay 46 to close. This closure causes the carriage drive motor 14 to run and move the sprayer carriage 10 across the conveyor. The control relay 46 is latched in the closed position through a pair of its normally open contacts and limit switches 38 and 39.

As the containers continue to advance the photocell 40 is reactivated and the signal to the photocell amplifier 45 is removed. However, the control relay 46 remains closed due to the latching circuit. When the gun carriage 10 completes the traverse it actuates limit switch 38 causing it to open and unlatch the control relay 46. Since the carriage drive motor 14 is connected through a second set of normally open contacts on the control relay 46 it stops running when the control relay is unlatched and remains off until the control relay 46 is again energized by the photocell amplifier 45. One traverse has thus been completed and the carriage 10 remains in that position until the next row of containers advances far enough for the photocell 40 to be interrupted and start the next traverse. This second traverse is stopped when limit switch 39 is actuated and unlatches the control relay 46 as limit switch 38 did at the end of the first traverse.

This system will cycle automatically every time a row of containers passes photocell 40 at a rate established by the rate of advancement of the containers. During the pause between each traverse the carriage support pivot system will automatically move the carriage to the proper angle A or B for the next pass.

Next, the switches 43 and 44 are provided on the frame member 7 above the edges of the conveyor 2 for alternately commencing and ceasing the sprayer operation when the carriage 10 passes in its reciprocal motion across the conveyor. However, this operation will be overridden by the system controlled by the cells 34 and 35.

The cells 34 and 35 on either side of cell 40 will prevent the spray guns 11 from spraying during the pass of the carriage 10 over the conveyor if either of the light beams from sources 36 and 37, respectively, are interrupted by any container or obstruction in the spaces between the containers. This is accomplished by proper positioning of the respective light sources 36 and 37 and photocells 34 and 35 such that the photocells are activated (indicating a row in proper alignment) when the beam to photocell 40 is interrupted.

As shown in FIG. 5, photocells 34 and 35 are connected to their individual respective photocell amplifiers 47 and 48 and control relays 49 and 50. When the photocells 34 and 35 "see light" a signal is sent to their respective amplifiers which causes the respective control relays to close thus establishing an electrical path to energize the spray gun solenoids 51 and 52. If one or both of the photocells 34 and 35 do not "see light" their respective control relays do not close and that particular gun solenoid 51 or 52 will not be energized. Energization of gun solenoids 51 and 52 takes place through wire $b$ which is energized when the carirage drive motor 14 is turned on.

The photocell control relay 49 and 50 for each respective gun solenoid 51 and 52 is latched shut in a manner similar to that described earlier for the control relay 46 which operated the carriage drive motor 14 through the two limit switches 38 and 39. Actuation of either limit switch causes the two control relays 49 and 50 for the gun solenoids 51 and 52 to drop out and both spray guns 11 are turned off. This again is accomplished through electrical path $a$.

It can be seen from a study of the above control system that if one container in any row is displaced fore or aft of its proper position that particular row will receive no spray coating. Since certain spray coatings in combination with certain container closures produce a defective seal between the closure and the top of the container and leakage or spoilage of the contents will result, it is better to avoid this critical defect and have one row of containers totally unsprayed rather than have any containers sprayed across the top of the finish.

Returning again to the pivoting of frame 7, with the frame arranged in the A attitude and the gun carriage 10 proceeding from right to left across the conveyor, the carriage 10 just prior to reaching the end of its travel actuates microswicth 38. This energizes the proper solenoid 54 in pilot valve 53 (shown in FIG. 6) to cause the frame 7 to swing to the opposite attitude B. The frame is then ready for travel of the carriage 10 back across the conveyor toward microswitch 39. As the carriage 10 starts its travel, microswitch 39 is de-energized and the pilot valve 53 stays in its last set position. When the carriage 10 reaches microswitch 39 it actuates the switch causing the other solenoid 55 in pilot valve 53 to be energized. This causes the air cylinder 27 to move the frame 7 to the position required, attitude A, for proper passage of the gun carriage 10 back across the conveyor 2 to retain the spray guns 11 over the spaces on either side of succeeding advancing rows of glass containers.

This positioning takes place automatically each time the gun carriage 10 reaches one or the other end of its travel so that the carriage support is always properly positioned to spray between rows of containers when the photocell system described above initiates the operation. The three cells 40, 34 and 35 of this system are in control on each pass of the carriage 10 across the conveyor.

To summarize the operation then, when a row of containers 1 passes the central photocell 40 the sprayer support carriage 10 begins its run across the conveyor 2 on the frame 7 arranged angularly in the attitude A. If the spaces on either side of the row of containers are unobstructed the switch means 44 will initiate spraying and the spray guns 11 will pass along the empty spaces spraying both sides of the centered row and one side of adjacent rows. If, however, either space is obstructed a signal from the respective photocell 34 or 35 will prevent the spraying operation and the carriage 10 will pass to the opposite side of the frame 7 without spraying. Upon reaching the opposite side of the frame, the switch means 43 will cause the spraying to cease, if it has been initiated and the carriage 10 will strike the switch 38 on the end of frame 7. The actuating of this switch 38 causes the actuator 27 to pivot the frame member 7 to the opposite position in the attitude B; the roller means 8 riding on the tracks 9 mounted on the supports 4. Upon reaching the opposite orientation B the carriage means 10 will start its return run across the conveyor 2 in response to the successive triggering of the center cell 40 by the next proceeding row of containers. The switch means 43 will initiate spraying in the absence of a signal from either of the outside cells 34 and 35 and the spray nozzles 26 will pass along over the successive empty spaces spraying the subsequent rows of containers. When the carriage 10 reaches the opposite side of the conveyor, switch means 44 will cause the spraying operation to cease and the carriage will strike switch means 39 on the end of the frame 7. The frame will thus be pivoted to its initial position in the attitude A ready for another circuit run across the conveyor.

It will thus be ssen that an improved apparatus and method for spray coating open mouth containers arranged in transverse rows on a moving conveyor is provided which permits increased speeds in glass manufacture by operating the spraying means on both passes over the conveyor while requiring only a structural modification of the conventional apparatus. An improved control system is also provided to facilitate this more efficient and rapid operation.

Having thus described our invention, we claim:

1. In an apparatus for spraying glass containers arranged in transverse rows on a moving conveyor the combination comprising support means positioned on opposite sides of the conveyor, a crossbeam mounted on the support means transverse to the motion of the conveyor, a pivot joint mounted on the crossbeam above the middle of the conveyor, a frame mounted on said pivot joint spanning said conveyor and angularly adjustable in the horizontal plane, a carriage mounted for horizontal reciprocal movement on said frame, downwardly directed spraying means mounted on said carriage and having head means, track means mounted on said support means, rollers mounted on said frame riding on said track means, actuating means for pivoting said frame between two preset positions, a plurality of juxtaposed photoelectric sensors arranged adjacent the conveyor in the line of travel of said conveyor, one of which initiates movement of said carriage in response to the passage of a row of containers on said conveyor, said remaining sensors preventing the spraying operation in response to the presence of obstructions in the space adjacent said row of containers, first switch means mounted at opposite ends of said frame for activating said actuating means in response to contact with said carriage, second switch means mounted on said frame above the edges of the conveyor for activating the spraying means during its traverse over the conveyor, and associated electrical control means whereby said spraying means passes between advancing rows of containers on each traverse of the carriage across the conveyor.

2. An apparatus as claimed in claim 1 wherein the spraying head means are angularly adjustable with respect to the vertical.

3. An apparatus as claimed in claim 1 in which there are three juxtaposed sensors, the center one of which initiates movement of said carriage, the outer ones of which prevent the spraying operation in response to obstructions in the space adjacent said row.

4. An apparatus as claimed in claim 3 in which each outer sensor controls a sprayer head located in the space adjacent the row of containers.

5. An apparatus as claimed in claim 1 wherein said spraying means includes two spraying heads which are angularly adjustable with respect to the vertical whereby they may be suitably oriented to spray the front and back of one row of containers and the nearer sides of adjacent rows of containers during a passage over the conveyor.

6. An apparatus as claimed in claim 1 wherein said spraying means includes two spraying heads which are angularly adjustable with respect to the vertical whereby they may be suitably oriented to spray the front and back of one row of containers at a time.

7. The method of spray coating the sides of open mouth glass containers arranged in transverse rows on a moving conveyor which comprises passing a downwardly directed spray in a horizontal plane across said conveyor at an obtuse angle to its forward movement, and along the advancing row of containers responsive to said containers breaking a first photoelectric beam and when other photoelectric beam means in the space behind said row is uninterrupted, and returning said spray at a different angle along another advancing row of containers when said first beam is interrupted and said other beam means is uninterrupted.

8. A method as claimed in claim 7 in which said spray is a cone-shaped mist and is situated no higher than the upper rim of said open mouth glass containers.

9. A method as claimed in claim 7 which further comprises passing a second downwardly directed spray means on the opposite side of said row from said first spray.

References Cited

UNITED STATES PATENTS

| | | | |
|---|---|---|---|
| 2,588,125 | 3/1952 | Knowland et al. | 117—105.3 |
| 3,184,328 | 5/1965 | Wagner et al. | 117—105.3 |
| 3,195,501 | 7/1965 | Barkhau | 118—324 X |
| 3,262,419 | 7/1966 | Knight | 118—323 X |

RALPH S. KENDALL, Primary Examiner

U.S. Cl. X.R.

117—105.3; 118— 315, 323, 324, 8, 2